US012658355B2

(12) United States Patent
Kim et al.

(10) Patent No.: US 12,658,355 B2
(45) Date of Patent: Jun. 16, 2026

(54) COIL SUBSTRATE AND ELECTRONIC APPARATUS INCLUDING THE SAME

(71) Applicant: STEMCO CO., LTD., Cheongju-si (KR)

(72) Inventors: Kang Dong Kim, Seongnam-si (KR); Chang Hoon Han, Sejong-si (KR); Hyun Woo Kim, Daejeon (KR); Su Jeong Shin, Cheongju-si (KR)

(73) Assignee: STEMCO CO., LTD., Cheongju-si (KR)

( * ) Notice: Subject to any disclaimer, the term of this patent is extended or adjusted under 35 U.S.C. 154(b) by 729 days.

(21) Appl. No.: 18/164,060

(22) Filed: Feb. 3, 2023

(65) Prior Publication Data

US 2023/0187120 A1 Jun. 15, 2023

Related U.S. Application Data

(63) Continuation of application No. PCT/KR2021/010002, filed on Jul. 30, 2021.

(30) Foreign Application Priority Data

Aug. 3, 2020 (KR) ........................ 10-2020-0096545

(51) Int. Cl.

| | |
|---|---|
| ***H01F 27/28*** | (2006.01) |
| ***H01F 5/00*** | (2006.01) |
| ***H01F 17/00*** | (2006.01) |

(52) U.S. Cl.

CPC ......... *H01F 27/2804* (2013.01); *H01F 5/003* (2013.01); *H01F 17/0006* (2013.01); *H01F 17/0013* (2013.01); *H01F 2027/2809* (2013.01)

(58) Field of Classification Search

CPC ............. H01F 17/0006; H01F 17/0013; H01F 27/2804; H01F 5/003; H01F 2027/2809

(Continued)

(56) References Cited

U.S. PATENT DOCUMENTS 10,147,529 B2 12/2018 Nishino et al.
2017/0146889 A1 * 5/2017 Bang .................. H02K 41/0354

(Continued)

FOREIGN PATENT DOCUMENTS

JP 2010-082501 A 4/2010
JP 6626729 B2 12/2019

(Continued)

OTHER PUBLICATIONS

International Search Report issued in PCT/KR2021/010002; mailed Nov. 9, 2021.

(Continued)

*Primary Examiner* — Rakesh B Patel
(74) *Attorney, Agent, or Firm* — Studebaker Brackett PLLC

(57) ABSTRACT

Provided is a coil substrate having an asymmetric structure, in which the area of a coil pattern included in a first region is expanded relative to the area of a coil pattern included in a second region with respect to a virtual axis, and an electronic apparatus having the same. The coil substrate comprises a base layer; and a coil pattern spirally wound on the base layer, wherein an upper portion of the base layer is divided into a first region and a second region based on a void region formed inside the coil pattern, wherein an area of the coil pattern formed in the second region is larger than an area of the coil pattern formed in the first region.

13 Claims, 18 Drawing Sheets

(58) Field of Classification Search
USPC .................................. 333/175, 185; 336/200
See application file for complete search history.

(56) References Cited

U.S. PATENT DOCUMENTS

| | | | | |
|---|---|---|---|---|
| 2017/0365389 | A1* | 12/2017 | Yosui | H01F 17/0013 |
| 2018/0174727 | A1* | 6/2018 | Kim | H01F 17/0013 |
| 2021/0272743 | A1* | 9/2021 | Kato | H01F 17/02 |

FOREIGN PATENT DOCUMENTS

| | | | |
|---|---|---|---|
| KR | 101527433 | B1 | 6/2015 |
| KR | 10-2017-0036347 | A | 4/2017 |
| KR | 10-2019-0013388 | A | 2/2019 |
| KR | 10-2020-0043056 | A | 4/2020 |

OTHER PUBLICATIONS

An Office Action; "Notice of Reasons for Refusal," mailed by the Japanese Patent Office on Jan. 30, 2024, which corresponds to Japanese Patent Application No. 2023-506512 and is related to U.S. Appl. No. 18/164,060.

* cited by examiner

FIG. 18

| CATEGORY | DISTANCE TO MAGNET | VOID REGION SIZE | FIRST REGION SIZE | SECOND REGION SIZE | WHETHER CENTER COINCIDE WITH MAGNET |
|---|---|---|---|---|---|
| CONTROL GROUP (PRIOR ART) | SAME | SAME | 0.5mm | 0.5mm | COINCIDENCE |
| EXPERIMENTAL GROUP 1 (PRESENT INVENTION) | SAME | SAME | 0.5mm | 0.6mm | COINCIDENCE |
| EXPERIMENTAL GROUP 2 | SAME | SAME | 0.55mm | 0.55mm | DISCORDANCE |
| EXPERIMENTAL GROUP 3 | SAME | SAME | 0.5mm | 0.6mm | DISCORDANCE |

COIL SUBSTRATE AND ELECTRONIC APPARATUS INCLUDING THE SAME

CROSS-REFERENCE TO RELATED APPLICATIONS

The present application is a continuation of International Patent Application No PCT/KR2021/010002, filed on Jul. 30, 2021, which is based upon and claims the benefit of priority to Korean Patent Application No. 10-2020-0096545, filed on Aug. 3, 2020. The disclosures of the above-listed applications are hereby incorporated by reference herein in their entirety.

BACKGROUND

1. Field

The present disclosure relates to a coil substrate and an electronic apparatus having the same. More specifically, it relates to a coil substrate capable of controlling the balance of electrical properties and an electronic apparatus having the same.

2. Description of the Related Art

In general, when a current flows through a wire in a magnetic field, the wire receives an electromagnetic force from the magnetic field. In particular, in the case of a coil, in which a wire is wound in a spiral form, electrical properties, such as electrical current, electromagnetic force, resistance, etc. are affected by the structure of the coil itself, such as the number of windings, winding direction, length or thickness of the wound wire, or the design structure of the magnetic material adjacent to the coil.

Recently, as a representative electronic apparatus, to which such a coil is applied, a camera actuator has been in the limelight.

SUMMARY

Referring to Japanese Patent Registration No. 6626729, when a control current is given to the first coil 51, while the magnetic field emitted from the magnet 52 mounted on the movable unit 20 and the control current move the lens holder 25 along the central axis O, a focus adjustment is made on the imaging element. Then, when a control current is given to the second coil 71 constituting the axis-crossing driving mechanism 70, the magnetic flux Φ from the first magnetizing surface 52*a* of the magnet 52 to the lower end 63*a* of the side plate portion 63 and the control current drive the movable unit 20 in a direction crossing the central axis O, thereby compensating for hand shake.

That is, since the camera actuator has a coil and a magnet provided close to the inside to drive a lens by interaction, a design considering mutual influences such as interval and matching of reference axes is required.

In addition, the structural design of the coil itself should be considered. In order to strengthen the electromagnetic force inside the actuator, it is effective to increase the number of windings and thickness of the coil, however if only the number of windings is increased, the resistance also increases at the same time, rather hindering the flow of current, and therefore, errors in driving control may occur or heat generation problems may occur. On the other hand, if only the thickness is increased, the resistance is lowered more than necessary, and another heating problem due to excessive current may occur.

An object of the present disclosure is to provide a coil substrate having an asymmetric structure, in which the area of the coil pattern included in the first region is expanded relative to the area of the coil pattern included in the second region with respect to a virtual axis, and an electronic apparatus having the same.

The objects of the present disclosure are not limited to the objects mentioned above, and other objects not mentioned will be clearly understood by those skilled in the art from the following description.

One aspect of the coil substrate of the present disclosure for achieving the above object comprises a base layer; and a coil pattern spirally wound on the base layer, wherein an upper portion of the base layer is divided into a first region and a second region based on a void region formed inside the coil pattern, wherein an area of the coil pattern formed in the second region is larger than an area of the coil pattern formed in the first region.

Wherein the first region and the second region are divided based on a reference axis line formed from one end of the base layer to the other end of the base layer along a longitudinal direction of the void region, and the reference axis line is formed across a center of a short axis of the void region.

Wherein the coil pattern comprises a plurality of first straight portions formed in the first region; a plurality of second straight portions formed in the second region; a plurality of third straight portions formed in the first region and the second region, and formed on both sides of the first straight portion and the second straight portion; a plurality of first curved portions formed in the first region and connecting the first straight portion and the third straight portion; and a plurality of second curved portions formed in the second region and connecting the second straight portion and the third straight portion.

Wherein the first straight portion is formed along a longitudinal direction of the first region, the second straight portion is formed parallel to the first straight portion, the third straight portion is formed in a direction perpendicular or oblique to the first straight portion and the second straight portion, and the first curved portion and the second curved portion are formed in an oblique shape or an arc shape.

Wherein a width of the plurality of second straight portions is wider than a width of the plurality of first straight portions.

Wherein a width of the plurality of third straight portions is the same as a width of the plurality of first straight portions, and a width of the plurality of second curved portions extends from the third straight portion in a direction of the second straight portion.

Wherein a width of the plurality of first curved portions is the same as a width of the plurality of first straight portions, a width of the plurality of second curved portions is the same as a width of the plurality of second straight portions, and a width of the plurality of third straight portions extends from the first curved portion in a direction of the second curved portion.

Wherein the number of windings of the second straight portion is the same as or greater than the number of windings of the first straight portion.

Wherein a width of the plurality of second straight portions is the same as a width of the plurality of first straight portions, and the number of windings of the second straight portions is greater than the number of the windings of the first straight portions.

The coil substrate further comprises a protective layer formed on the coil pattern and for protecting the coil pattern.

Wherein the coil pattern is formed on one surface of the base layer in plural, or at least one coil pattern is formed on both surfaces of the base layer, respectively, an interlayer insulating layer is formed between two adjacent coil patterns when the coil pattern is formed on one surface of the base layer in plural.

One aspect of the electronic apparatus of the present disclosure for achieving the above object comprises a housing; a coil substrate installed inside the housing; and a magnetic material spaced apart from the coil substrate and installed inside the housing, wherein the coil substrate comprises a base layer; and a coil pattern spirally wound on the base layer, wherein an upper portion of the base layer is divided into a first region and a second region based on a void region formed inside the coil pattern, wherein an area of the coil pattern formed in the second region is larger than an area of the coil pattern formed in the first region.

Wherein the housing is a housing of a camera actuator.

Wherein both sides of the magnetic material are symmetrical with the same reference as the void region of the coil substrate.

The details of other embodiments are included in the detailed description and drawings.

The present disclosure provides the following effects by providing a coil substrate having an asymmetric structure and an electronic apparatus including the same.

First, it is possible to provide a coil substrate capable of controlling electrical properties such as electromagnetic force and resistance within a limited area.

Second, by designing the structure of the electronic apparatus in consideration of the relationship between the coil substrate and the adjacent magnetic material according to the present disclosure, the strength of the electromagnetic force, the amount of change in the electromagnetic force, and the balance of resistance and current can be efficiently controlled.

Third, the performance of the electronic apparatus for each purpose can be maximized by variously modifying the structural design of the coil substrate and the magnetic material adjacent thereto according to the present disclosure.

BRIEF DESCRIPTION OF THE DRAWINGS

These and/or other aspects will become apparent and more readily appreciated from the following description of the embodiments, taken in conjunction with the accompanying drawings in which:

FIG. 18 is an experimental example comparing the prior art and the present disclosure.

DETAILED DESCRIPTION

Figure 1:
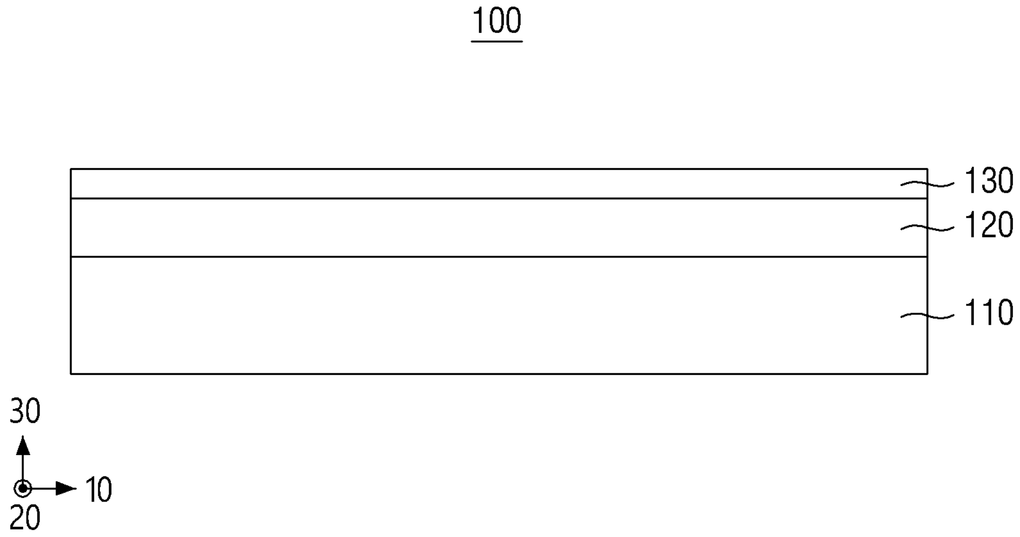
FIG. 1 is a cross-sectional view of a coil substrate according to an embodiment of the present disclosure.

Hereinafter, preferred embodiments of the present disclosure will be described in detail with reference to the accompanying drawings. Advantages and features of the present disclosure and methods of achieving them will become apparent with reference to the embodiments described below in detail in conjunction with the accompanying drawings. However, the present disclosure is not limited to the embodiments described below, but may be implemented in various different forms, and these embodiments are provided only for making the description of the present disclosure complete and fully informing those skilled in the art to which the present disclosure pertains on the scope of the present disclosure, and the present disclosure is only defined by the scope of the claims. Like reference numerals refer to like elements throughout.

When an element or layer is referred as being located “on” another element or layer, it includes not only being located directly on the other element or layer, but also with intervening other layers or elements. On the other hand, when an element is referred as being “directly on” or “immediately on,” it indicates that no intervening element or layer is interposed.

Spatially relative terms “below,” “beneath,” “lower,” “above,” and “upper” can be used to easily describe a correlation between an element or components and other elements or components. The spatially relative terms should be understood as terms including different orientations of the device during use or operation in addition to the orientation shown in the drawings. For example, when an element shown in the figures is turned over, an element described as "below" or "beneath" another element may be placed "above" the other element. Accordingly, the exemplary term "below" may include both directions below and above. The device may also be oriented in other orientations, and thus spatially relative terms may be interpreted according to orientation.

Although first, second, etc. are used to describe various elements, components, and/or sections, it should be understood that these elements, components, and/or sections are not limited by these terms. These terms are only used to distinguish one element, component, or section from another element, component, or section. Accordingly, the first element, the first component, or the first section mentioned below may be the second element, the second component, or the second section within the technical idea of the present disclosure.

The terminology used herein is for the purpose of describing the embodiments and is not intended to limit the present disclosure. In the present disclosure, the singular also includes the plural, unless specifically stated otherwise in the phrase. As used herein, "comprises" and/or "comprising" refers to that components, steps, operations and/or elements mentioned does not exclude the presence or addition of one or more other components, steps, operations and/or elements.

Unless otherwise defined, all terms (including technical and scientific terms) used herein may be used with the meaning commonly understood by those of ordinary skill in the art to which the present disclosure belongs. In addition, terms defined in a commonly used dictionary are not to be interpreted ideally or excessively unless clearly defined in particular.

Hereinafter, embodiments of the present disclosure will be described in detail with reference to the accompanying drawings, and in the description with reference to the accompanying drawings, the same or corresponding components are given the same reference numbers, regardless of reference numerals in drawings, and an overlapped description therewith will be omitted.

The present disclosure relates to an asymmetric coil substrate and an electronic apparatus including the same. The coil substrate of the present disclosure may have an asymmetric structure, in which the area of the coil pattern included in the first region and the area of the coil pattern included in the second region are formed to be different from each other with respect to a virtual axis. The area of the coil pattern may mean ① the cross-sectional area of the coil pattern in one direction, ② the area of the upper or side surface not in contact with the base layer described later, and ③ the sum of the area of ① or ② and the area of the base layer exposed between the coil patterns.

Hereinafter, the present disclosure will be described in detail with reference to drawings and the like.

FIG. 1 is a cross-sectional view of a coil substrate according to an embodiment of the present disclosure.

According to FIG. 1, a coil substrate 100 may include a base layer 110, a coil pattern 120 and a protective layer 130.

The base layer 110 refers to a base film, and may be formed to have a predetermined thickness (e.g., 5 μm to 100 μm) in the form of a flat plate. The base layer 110 may be formed of any one of a flexible film, a rigid film, and a rigid flexible film.

The base layer 110 may be made of at least one material selected from various polymer materials. The base layer 110 may be manufactured using at least one material selected from polymer materials such as, for example, Poly-Imide, Poly-Ethylene Terephthalate (PET), Poly-Ethylene Naphthalate (PEN), Poly-Carbonate, epoxy and glass fiber.

A seed layer (not shown) or an under layer made of a conductive material may be formed on one surface or both surfaces of the base layer 110. The seed layer may be formed on the base layer 110 using at least one conductive material selected from among metals such as nickel (Ni), chromium (Cr), copper (Cu), and gold (Au), and may be formed on the base layer 110 using a physical method or a chemical method such as deposition, adhesion or plating. Meanwhile, the seed layer may not be formed on the base layer 110.

The coil pattern 120, through which current flows, is for inducing electromagnetic force. The coil pattern 120 may be formed by spirally winding on the base layer 110.

The coil pattern 120 may be formed on the base layer 110 and made of a conductive material. The coil pattern 120 may be formed on the base layer 110 by using at least one conductive material selected from among metals such as, for example, silver (Ag), palladium (Pd), aluminum (Al), nickel (Ni), titanium (Ti), gold (Au), platinum (Pt), copper (Cu), or the like.

The coil pattern 120 may be formed on the base layer 110 using various techniques such as plating, printing, and coating. When the coil pattern 120 is formed on the base layer 110 using plating, it may be formed on the base layer 110 by performing plating one or more times, and at this time, one or more boundary lines may be formed on the cross section of the coil pattern 120 by the number of plating processes, a change in plating conditions, and the like.

When the coil pattern 120 is formed on the base layer 110 using plating, any one of electroplating and electroless plating may be used. When the coil pattern 120 is formed on the base layer 110 using electroplating, it may be formed on a portion where a resist pattern layer (not shown) is not formed.

The resist pattern layer is a resin layer made of an insulating material and may be formed on the base layer 110 prior to the coil pattern 120. The coil pattern 120 may be formed on the base layer 110 to have the same thickness as the resist pattern layer, or may be formed on the base layer 110 to have a thickness smaller than that of the resist pattern layer. When the coil pattern 120 is formed as described above, it is possible to prevent the plating from being biased on the upper portion, and the width of the upper portion and the width of the lower portion may be uniformly formed.

Meanwhile, the resist pattern layer may be removed from the base layer 110 after the coil pattern 120 is formed on the base layer 110. In this case, the resist pattern layer may be removed on the base layer 110 before forming the protective layer 130 on the coil pattern 120.

The protective layer 130 is formed to cover the upper portion of the coil pattern 120 to protect the coil pattern 120. The protective layer 130 may be formed on the coil pattern 120 after the resist pattern layer is removed.

The protective layer 130 may be formed of an insulating material. The protective layer 130 may be formed of, for example, solder resist. However, the present embodiment is not limited thereto. The protective layer 130 may also be formed of the same material as the base layer 110.

Meanwhile, the protective layer 130 may be formed on the coil pattern 120 using various methods such as printing, coating, and photolithography.

As described above, the coil pattern 120 may be formed by spirally winding on the base layer 110. As shown in FIG.

2, the coil pattern 120 may be divided into a first region 210 and a second region 220 based on the reference axis line R.

Figure 2:
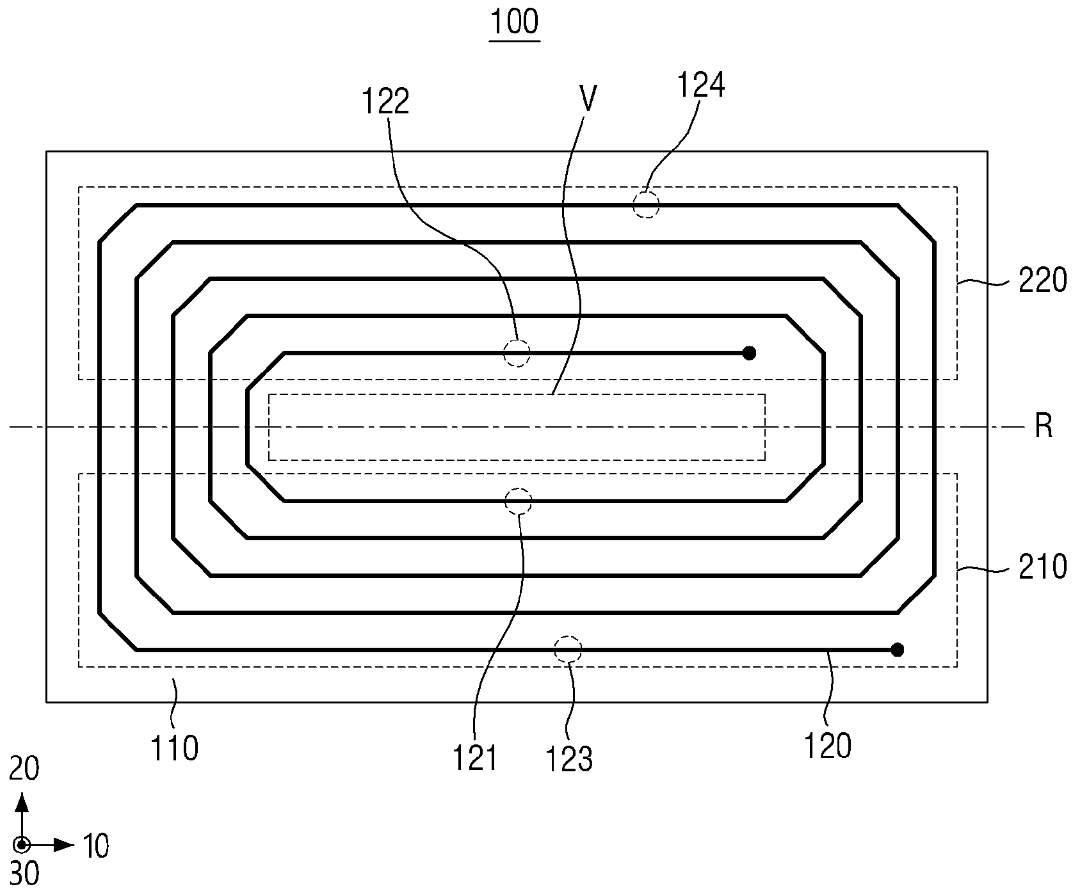
FIG. 2 is a plan view of a coil pattern constituting a coil substrate according to an embodiment of the present disclosure.

FIG. 2 is a plan view of a coil pattern constituting a coil substrate according to an embodiment of the present disclosure. The following description refers to FIG. 2.

When the coil pattern 120 is spirally wound on the base layer 110 and formed, inside the coil pattern 120, a void region V with a predetermined area with respect to one surface of the base layer 110 may be formed. Here, the void region V refers to an open space formed between the innermost coil patterns 121 and 122 of the first region 210 and the second region 220, and may overlap the pad portion (not shown) of the coil pattern 120. That is, the void region V may correspond to or include the central region of the coil pattern 120.

The reference axis line R refers to a line segment extending in the first direction 10 within the void region V, and the first direction 10 may be the long axis direction of the coil pattern 120, that is, the longitudinal direction of the void region V. In the present disclosure, the reference axis line R extending in the first direction 10 to cross the width direction of the void region V will be described as an example, but is not limited thereto, and it may be the short axis direction of the coil pattern 120 or the width direction of the void region V.

The first region 210 refers to an area occupied by the coil pattern 120 formed on one side of the base layer 110 with respect to the reference axis line R. Also, the second region 220 refers to an area occupied by the coil pattern 120 formed on the other side of the base layer 110 with respect to the reference axis line R.

Figure 3:
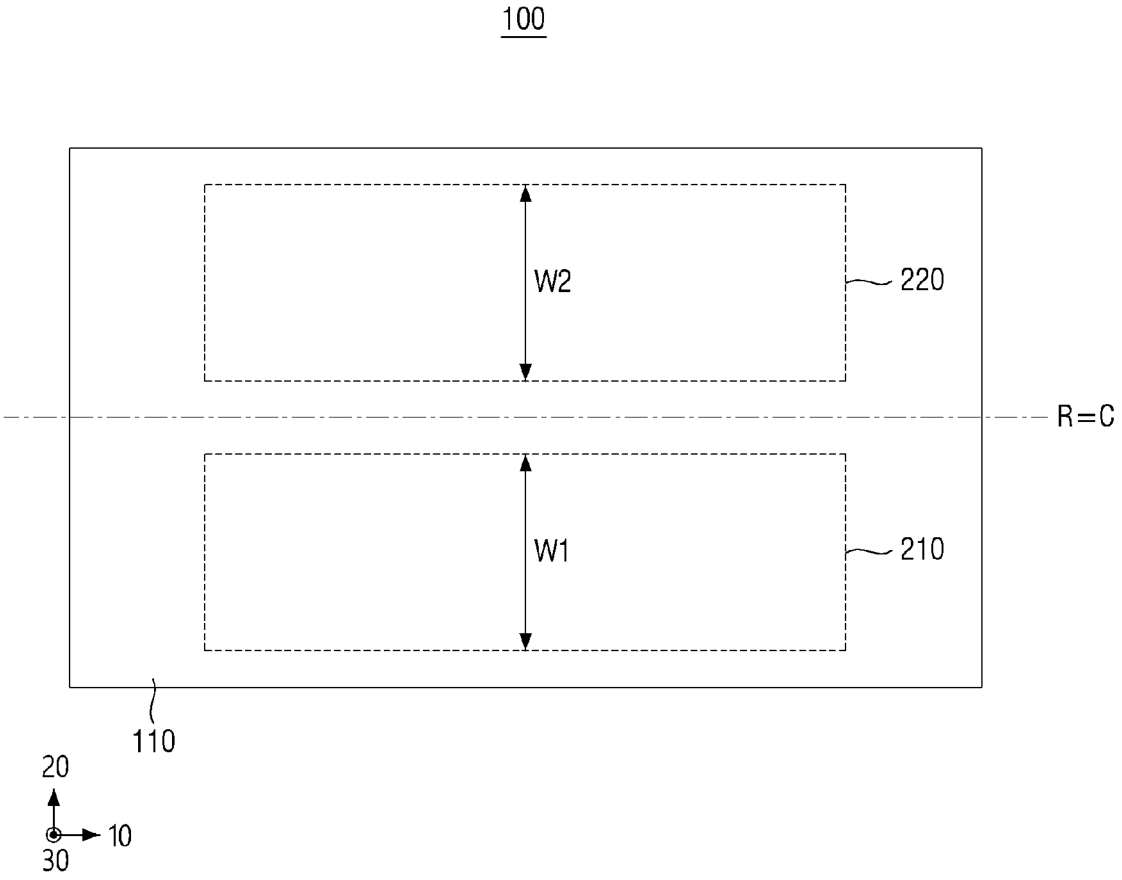
FIG. 3 is a first exemplary view for describing an installation form of a coil pattern constituting a coil substrate according to an embodiment of the present disclosure.

The first region 210 and the second region 220 may be symmetrically formed on the base layer 110 based on the reference axis line R. As shown in FIG. 3, the first region 210 may be formed to have the same width as the second region 220 (W1=W2). In the above, having the same width means that the distance to one side of the outermost coil patterns 123 and 124 from one side of the innermost coil patterns 121 and 122 of each of the first region 210 and the second region 220 is the same or equivalent level.

In this case, the reference axis line R in the void region V at the first position may be regarded as the center C of the coil pattern 120, and more specifically, may be assumed as a line segment crossing the center of the short axis of the void region V. FIG. 3 is a first exemplary view for describing an installation form of a coil pattern constituting a coil substrate according to an embodiment of the present disclosure.

However, the present embodiment is not limited thereto. It is possible that a line segment crossing the center of the short axis of the void region V is referred to as a reference axis line R, and the outermost coil pattern of any one of the first region or the second region is spaced apart and the first region 210 and the second region 220 are formed to have different widths.

Figure 4:
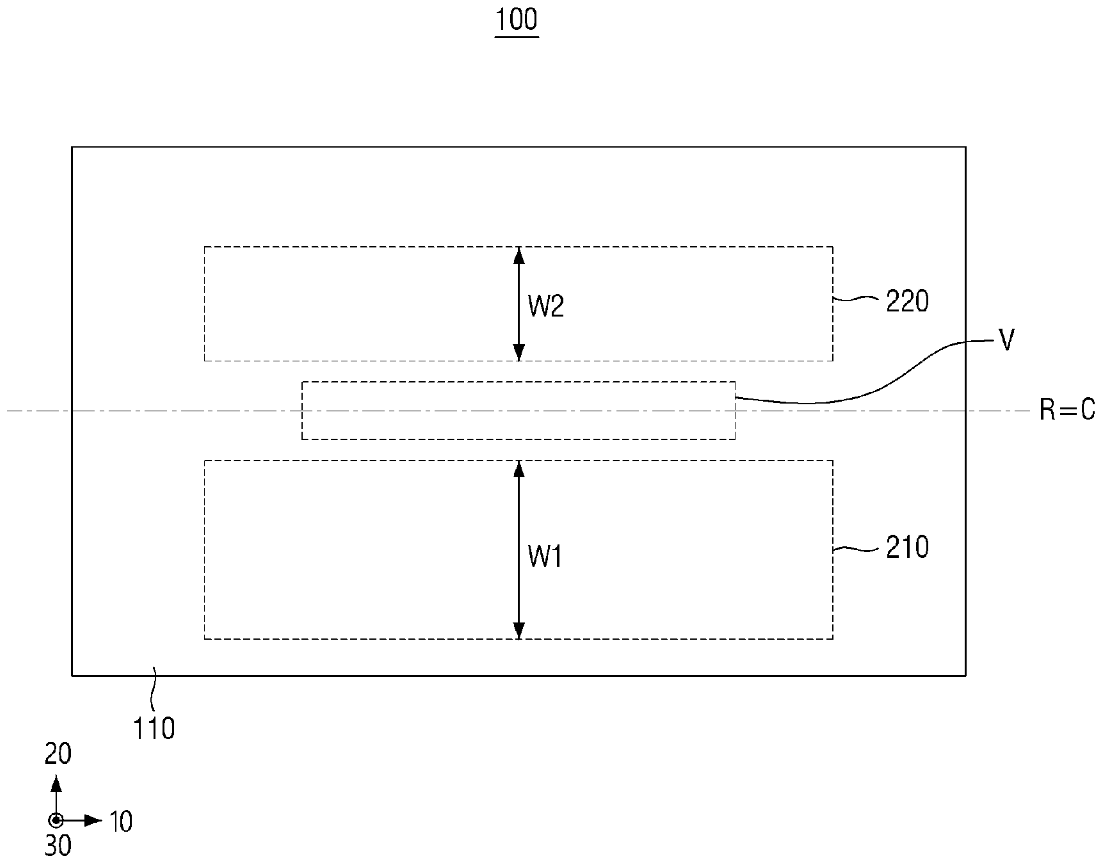
FIG. 4 is a second exemplary diagram for describing an installation form of a coil pattern constituting a coil substrate according to an embodiment of the present disclosure.
Figure 5:
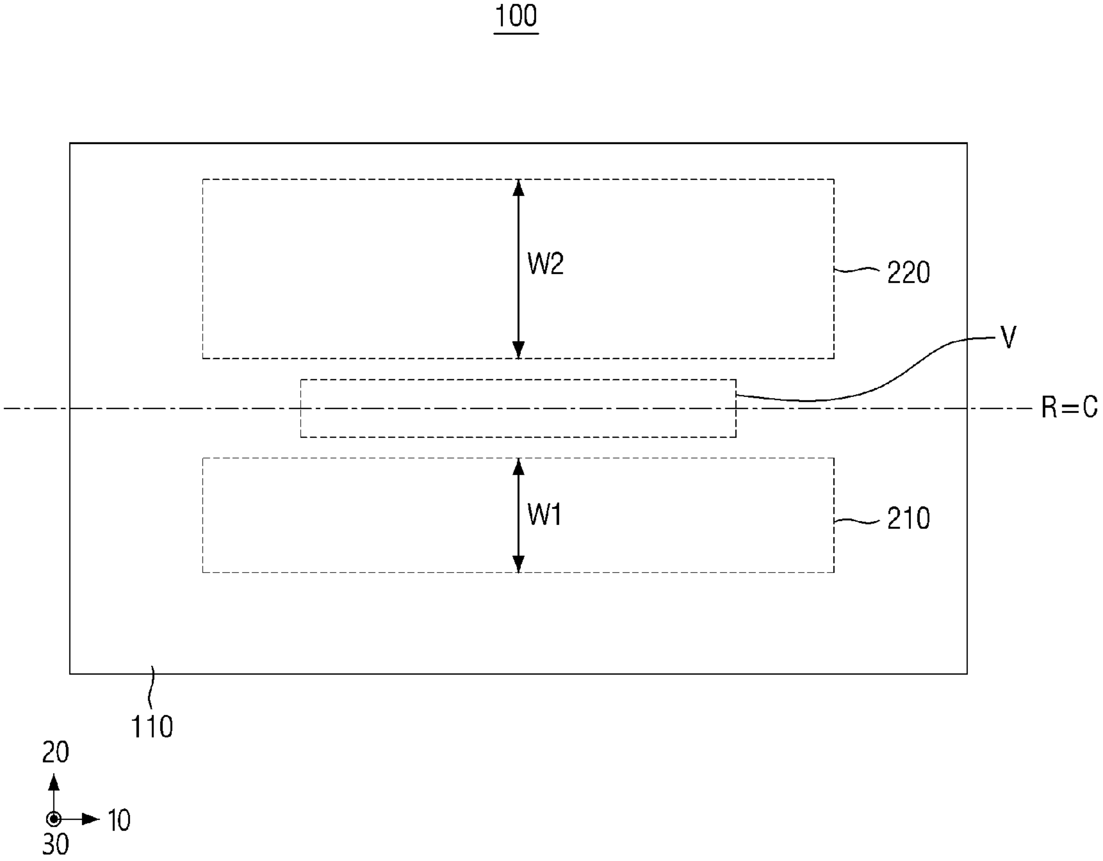
FIG. 5 is a third exemplary view for describing an installation form of a coil pattern constituting a coil substrate according to an embodiment of the present disclosure.

For example, as shown in FIG. 4, the first region 210 may be formed to have a wider width than the second region 220 (W1>W2). Alternatively, as shown in FIG. 5, the first region 210 may be formed to have a narrower width than the second region 220 (W1<W2). FIG. 4 is a second exemplary view for describing an installation form of a coil pattern constituting a coil substrate according to an embodiment of the present disclosure, and FIG. 5 is a third exemplary view for describing the installation form of a coil pattern constituting a coil substrate according to an embodiment of the present disclosure.

In the above case, the purpose is to lower the resistance of the coil pattern or to improve the strength of the electromagnetic force, but it can be applied when the area, in which the coil pattern can be expanded, is limited in the substrate, thereby even securing a balance with the magnetic matter described later.

Figure 6:
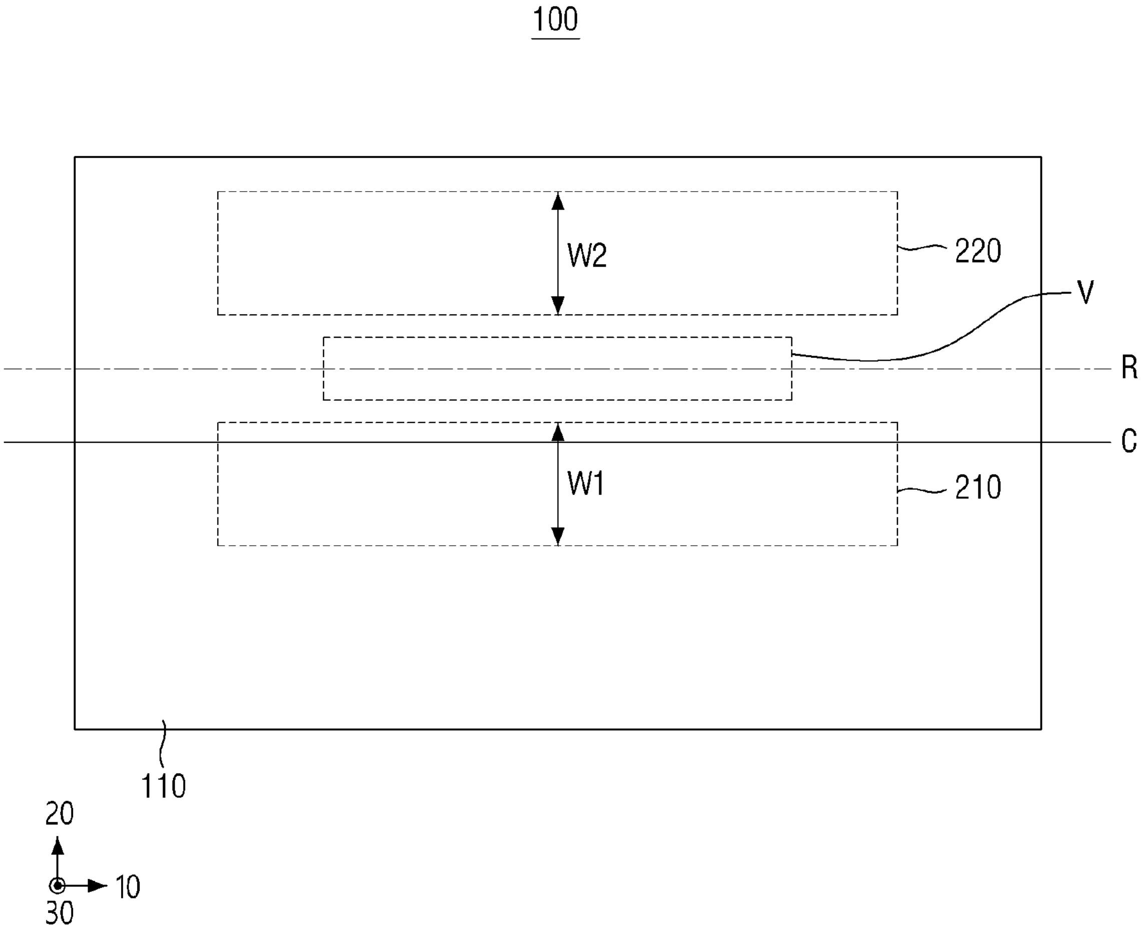
FIG. 6 is a fourth exemplary view for describing an installation form of a coil pattern constituting a coil substrate according to an embodiment of the present disclosure.

On the other hand, as shown in FIG. 6, the innermost and outermost coil patterns of the first region 210 and the second region 220 are spaced apart at the same distance or at an equal level, respectively, so that the void region V can be formed at the second position. That is, the area of the coil pattern may be expanded or reduced compared to the embodiment shown in FIG. 3.

Figure 7:
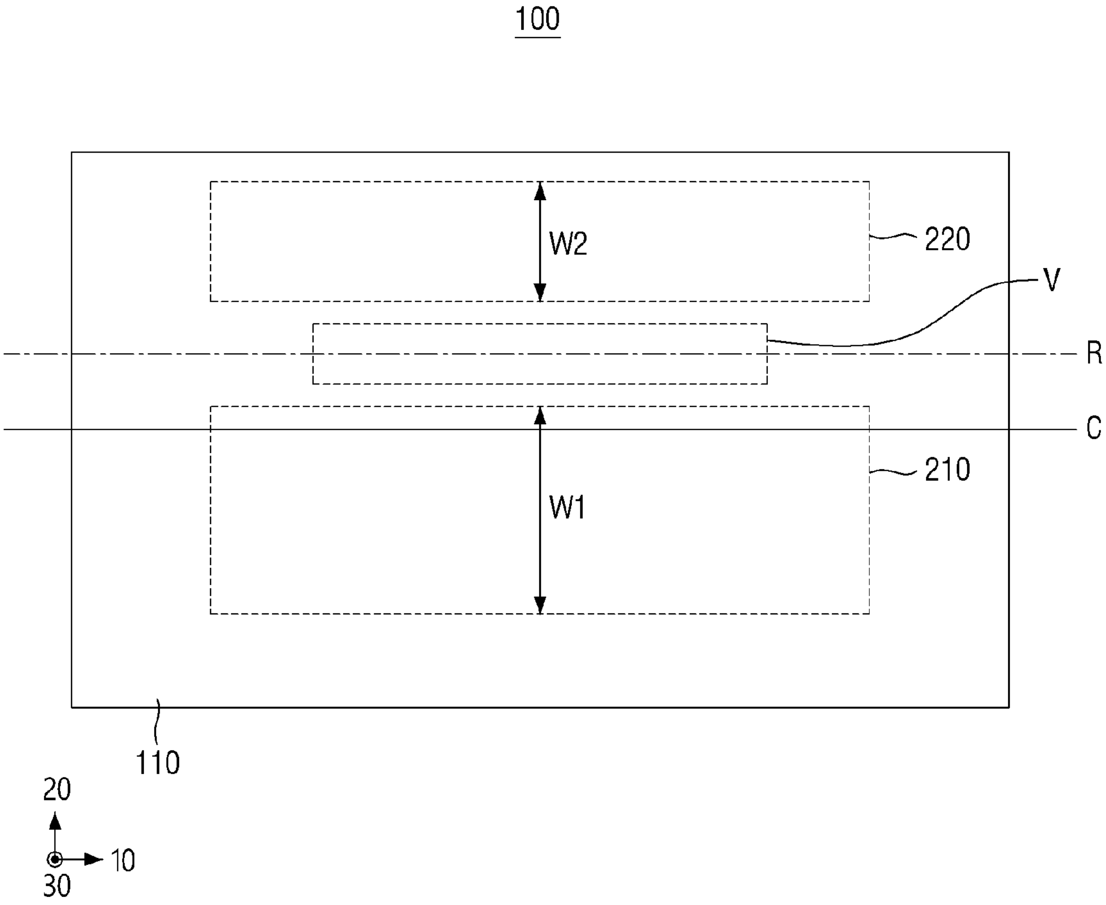
FIG. 7 is a fifth exemplary diagram for describing an installation form of a coil pattern constituting a coil substrate according to an embodiment of the present disclosure.

In addition, as shown in FIG. 7, a void region V is formed at the second position, but the outermost coil pattern of any one of the first region 210 and the second region 220 is spaced apart so that both regions may be formed in different sizes. FIG. 6 is a fourth exemplary view for describing an installation form of a coil pattern constituting a coil substrate according to an embodiment of the present disclosure, and FIG. 7 is a fifth exemplary view for describing the installation form a coil pattern constituting a coil substrate according to an embodiment of the present disclosure.

Figure 8:
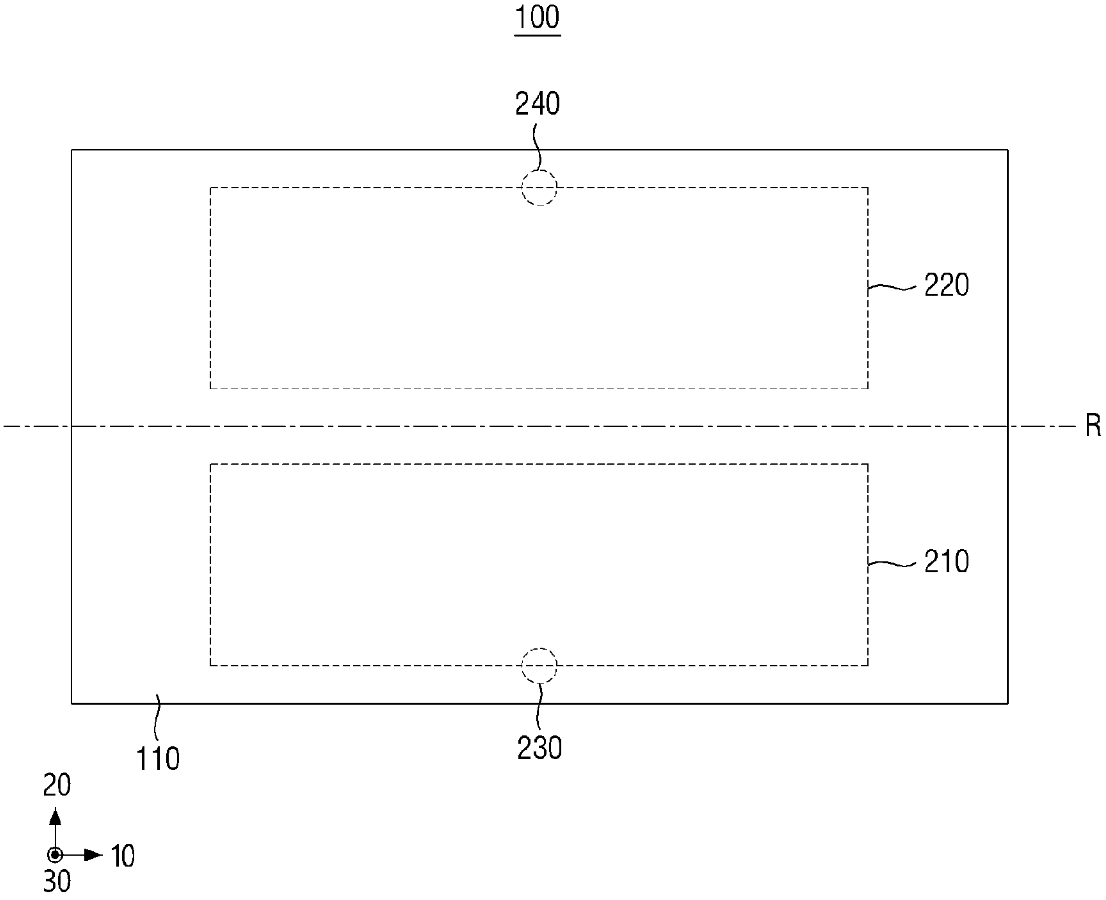
FIG. 8 is a sixth exemplary view for describing an installation form of a coil pattern constituting a coil substrate according to an embodiment of the present disclosure.
Figure 9:
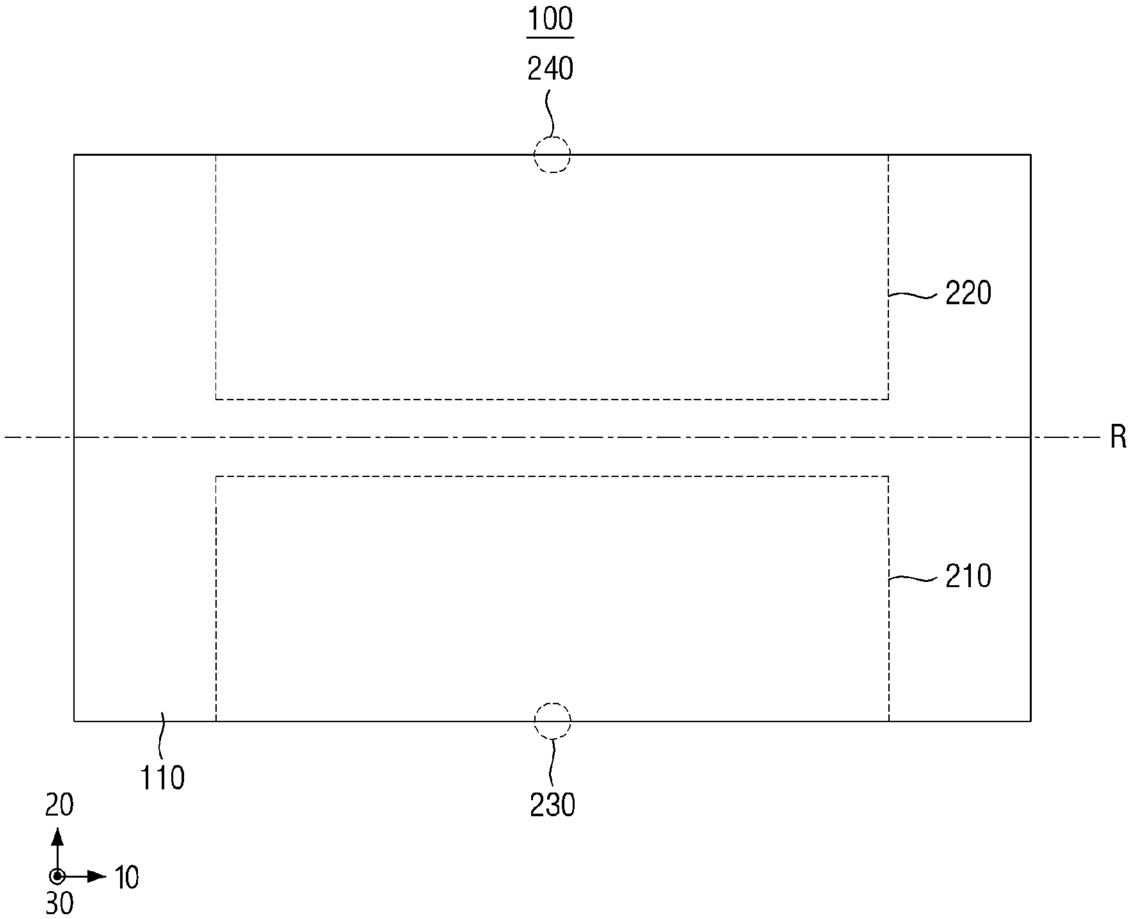
FIG. 9 is a seventh exemplary view for describing an installation form of a coil pattern constituting a coil substrate according to an embodiment of the present disclosure.

Meanwhile, the first region 210 cannot be formed beyond the outer circumferential surface of the base layer 110. That is, the outermost side 230 of the coil pattern 120 formed on the first region 210 may be disposed inside the outer circumferential surface of the base layer 110 as shown in FIG. 8 or may be disposed on the same line as the outer circumferential surface of the base layer 110 as shown in FIG. 9. FIG. 8 is a sixth exemplary view for describing an installation form of a coil pattern constituting a coil substrate according to an embodiment of the present disclosure, and FIG. 9 is a seventh exemplary view for describing the installation form a coil pattern constituting a coil substrate according to an embodiment of the present disclosure.

The reference axis line R shown in FIGS. 3 to 7 above may be the same as or different from the center of the base layer 110.

Similarly, the second region 220 cannot be formed beyond the outer circumferential surface of the base layer 110. That is, the outermost side 240 of the coil pattern 120 formed on the second region 220 may be disposed inside the outer circumferential surface of the base layer 110 as shown in FIG. 8 or may be disposed on the same line as the outer circumferential surface of the base layer 110 as shown in FIG. 9.

In addition, the outermost sides of the first region 210 and the second region 220 may be disposed inside the outer circumferential surface of the base layer 110 at the same or different distances.

Meanwhile, when the outermost side 230 of the coil pattern 120 formed on the first region 210 is disposed inside the outer circumferential surface of the base layer 110 as shown in FIG. 8, the outermost side 240 of the coil pattern 120 formed on the second region 220 may be disposed on the same line as the outer circumferential surface of the base layer 110 as shown in FIG. 9.

In addition, when the outermost side 230 of the coil pattern 120 formed on the first region 210 is disposed on the same line as the outer circumferential surface of the base layer 110 as shown in FIG. 9, the outermost side 240 of the coil pattern 120 formed on the second region 220 may be disposed inside the outer circumferential surface of the base layer 110 as shown in FIG. 8.

In addition, in the embodiment including FIGS. 8 and 9 above, the first region 210 and the second region 220 may have the same or different widths depending on the position of the void region V or the reference axis line R, as shown in FIGS. 4 to 7 above.

When the coil pattern 120 is spirally wound on the base layer 110 and formed, it may include n straight portions and m curved portions. The straight portion means a coil pattern formed from one end to the other end where the traveling direction does not change, and the curved portion means a coil pattern connecting two straight portions formed in different traveling directions.

Figure 10:
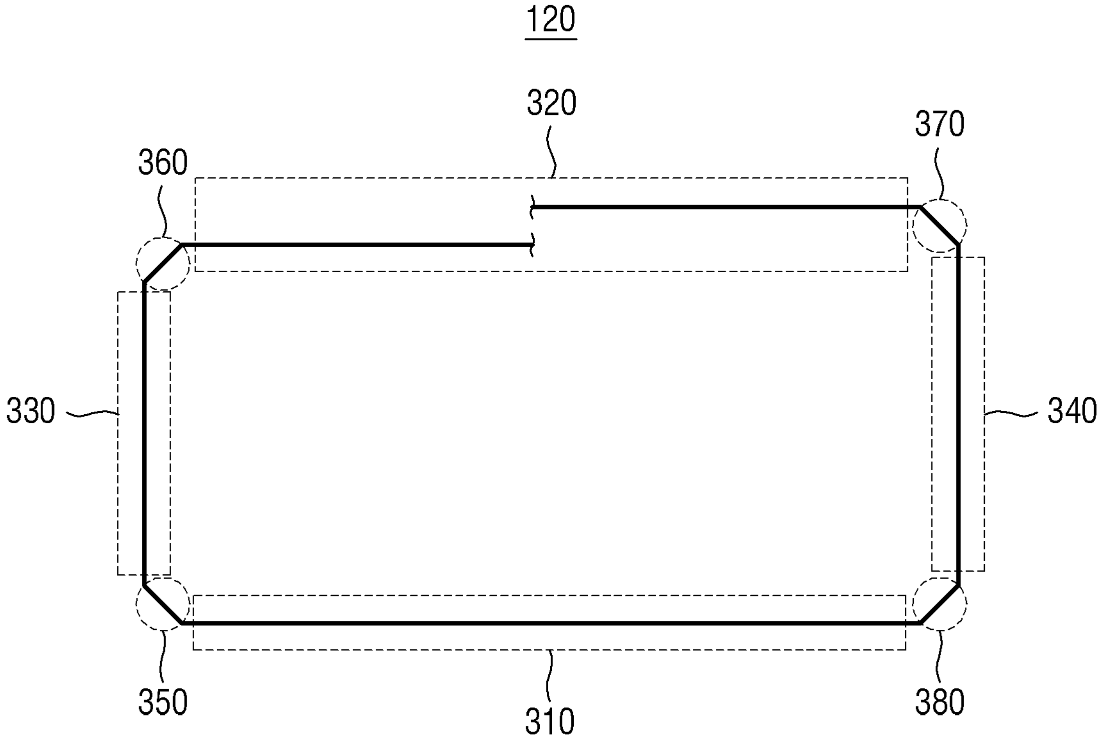
FIG. 10 is an exemplary view for describing the structure of a coil pattern constituting a coil substrate according to an embodiment of the present disclosure.

FIG. 10 is an exemplary view for describing the structure of a coil pattern constituting a coil substrate according to an embodiment of the present disclosure.

According to FIG. 10, the coil pattern 120 may include a first straight portion 310, a second straight portion 320, a third straight portion 330, a fourth straight portion 340, a first curved portion 350, a second curved portion 360, a third curved portion 370 and a fourth curved portion 380.

The first straight portion 310 refers to a coil pattern formed in a straight line shape on the first region 210. A plurality of such first straight portions 310 may be formed on the first region 210 in the first direction 10.

The second straight portion 320 refers to a coil pattern formed in a straight line shape on the second region 220. A plurality of second straight portions 320 may be formed on the second region 220 in the same direction as the first straight portion 310 (i.e., in the first direction 10).

The third straight portion 330 and the fourth straight portion 340 refer to a coil pattern formed in a straight line shape over the first region 210 and the second region 220 and connecting the first straight portion 310 and the second straight portion 320, respectively. A plurality of the third straight line portions 330 and a plurality of the fourth straight portions 340 may be formed on the first region 210 and the second region 220 in a direction orthogonal to the first straight portion 310 and the second straight portion 320 (i.e., the second direction 20).

The first curved portion 350 refers to a coil pattern formed in an oblique shape on the first region 210. The first curved portion 350 may connect the first straight portion 310 and the third straight portion 330 to each other on the first region 210. The first curved portion 350 may be formed in the same number as at least one of the first straight portion 310 and the third straight portion 330.

The second curved portion 360 refers to a coil pattern formed in an oblique shape on the second region 220. The second curved portion 360 may connect the second straight portion 320 and the third straight portion 330 to each other on the second region 220. The second curved portion 360 may be formed in the same number as at least one of the second straight portion 320 and the third straight portion 330.

The third curved portion 370 is formed in an oblique shape on the second region 220 and may connect the second straight portion 320 and the fourth straight portion 340 to each other, and the fourth curved portion 380 is formed in an oblique shape on the first region 220 and may connect the fourth straight portion 340 and the first straight portion 310 to each other. Like the first curved portion 350 and the second curved portion 360, the third curved portion 370 and the fourth curved portion 380 also may be formed in the same number as at least one straight portion among both straight portions connected to each other.

In addition, the first curved portion 350 to the fourth curved portion 380 in the present disclosure are shown as straight-type oblique lines, but may also be formed in a curved arc type (⌒), and may be formed in different types.

A first straight portion 310, a second straight portion 320, a third straight portion 330, a fourth straight portion 340, a first curved portion 350, a second curved portion 360, a third curved portion 370 and a fourth curved portion 380 may be formed on the first region 210 and the second region 220 in plural, respectively. In this case, the first straight portion 310 to the fourth straight portion 340 and the first curved portion 350 to the fourth curved portion 380 may all have the same width. However, the present embodiment is not limited thereto. The first straight portion 310 to the fourth straight portion 340 and the first curved portion 350 to the fourth curved portion 380 may all have different widths. On the other hand, it is possible that some of the first straight portion 310 to fourth straight portion 340 and the first curved portion 350 to fourth curved portion 380 are formed to have the same width, and others are formed to have different widths.

Meanwhile, all of the plurality of first straight portions 310 may be formed to have the same width. However, the present embodiment is not limited thereto. The plurality of first straight portions 310 may all be formed to have different widths. Meanwhile, some of the plurality of first straight portions 310 may be formed to have the same width, and some other may be formed to have different widths.

Meanwhile, a plurality of second straight portions 320, a plurality of third straight portions 330, a plurality of fourth straight portions 340, a plurality of first curved portions 350, a plurality of second curved portions 360, a plurality of third curved portions 370, a plurality of fourth curved portions 380, etc. may be formed similarly to the case of the plurality of first straight portions 310.

In this embodiment, the first straight portion 310, and the first curved portion 350 and the fourth curved portion 380 on the first region 210, and the second straight portion 320, and the second curved portion 360 and the third curved portion 370 on the second region 220 are partially formed in the same or different shapes so that the cross-sectional area of the coil pattern 120 on the first region 210 may be smaller than the cross-sectional area of the coil pattern 120 on the second region 220. According to this embodiment, the position of the void region V inside the coil pattern 120 may be spaced apart or the size may be expanded or reduced.

In the following, the effect of the present disclosure, in which the performance of the electronic apparatus, to which the coil substrate 100 is applied, is maximized by providing the coil substrate 100 formed in an asymmetrical structure by the above configuration of the present disclosure so that electromagnetic force, resistance, etc. can be controlled in the coil substrate 100 of a limited area, will be described in detail.

(I) When the number of windings of the coil patterns 120 formed on the first region 210 and the number of windings of the coil patterns 120 formed on the second region 220 are the same (i) When the pattern width of the second straight portion 320 is wider than the pattern width of the first straight portion 310

Figure 11:
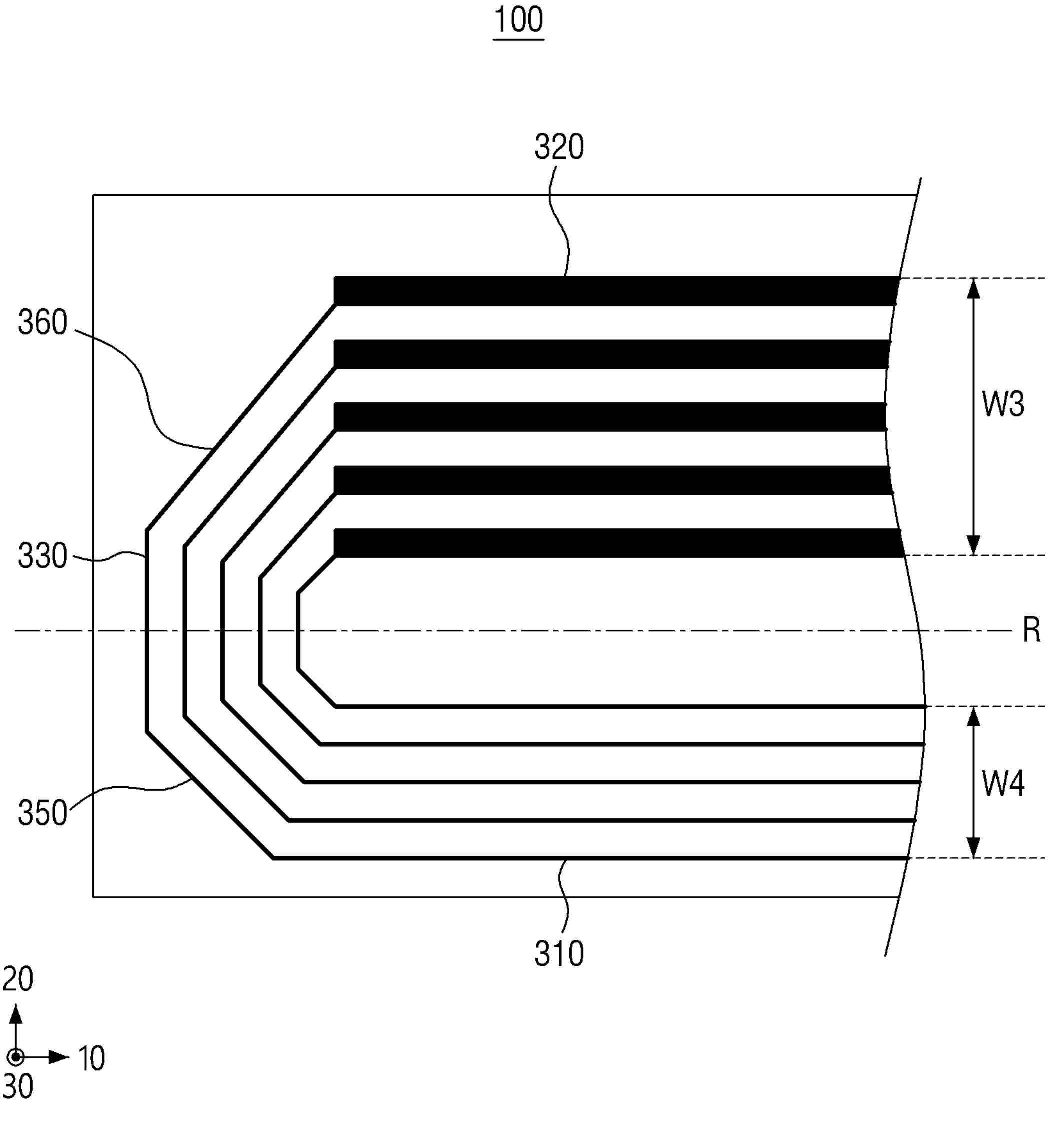
FIG. 11 is a first exemplary diagram for describing various shapes of coil patterns constituting a coil substrate according to an embodiment of the present disclosure.

When the width of the second straight portion 320 is formed by extending the width of the first straight portion 310, as shown in FIG. 11, the width W3 formed by the second straight portion 320 may be wider than the width W4 formed by the first straight portion 310 (W3>W4). When the plurality of first straight portions 310 and the plurality of second straight portions 320 are formed in the first region 210 and the second region 220 in this way, respectively, an area of the coil pattern 120 on the second region 220 may be larger than that of the coil pattern 120 on the first region 210.

FIG. 11 is a first exemplary view for describing various shapes of coil patterns constituting a coil substrate according to an embodiment of the present disclosure.

In the above case, since the area of the coil pattern 120 on the second region 220 can be expanded in the direction of the short axis, the current flow is smoothed by lowering the resistance, and furthermore, the effect of strengthening the strength of the electromagnetic force can be obtained.

(ii) When the pattern width of at least one of the second straight portion 320, the fourth straight portion 340, the second curved portion 360, and the third curved portion 370 is wider than the pattern width of the first straight portion 310

Figure 12:
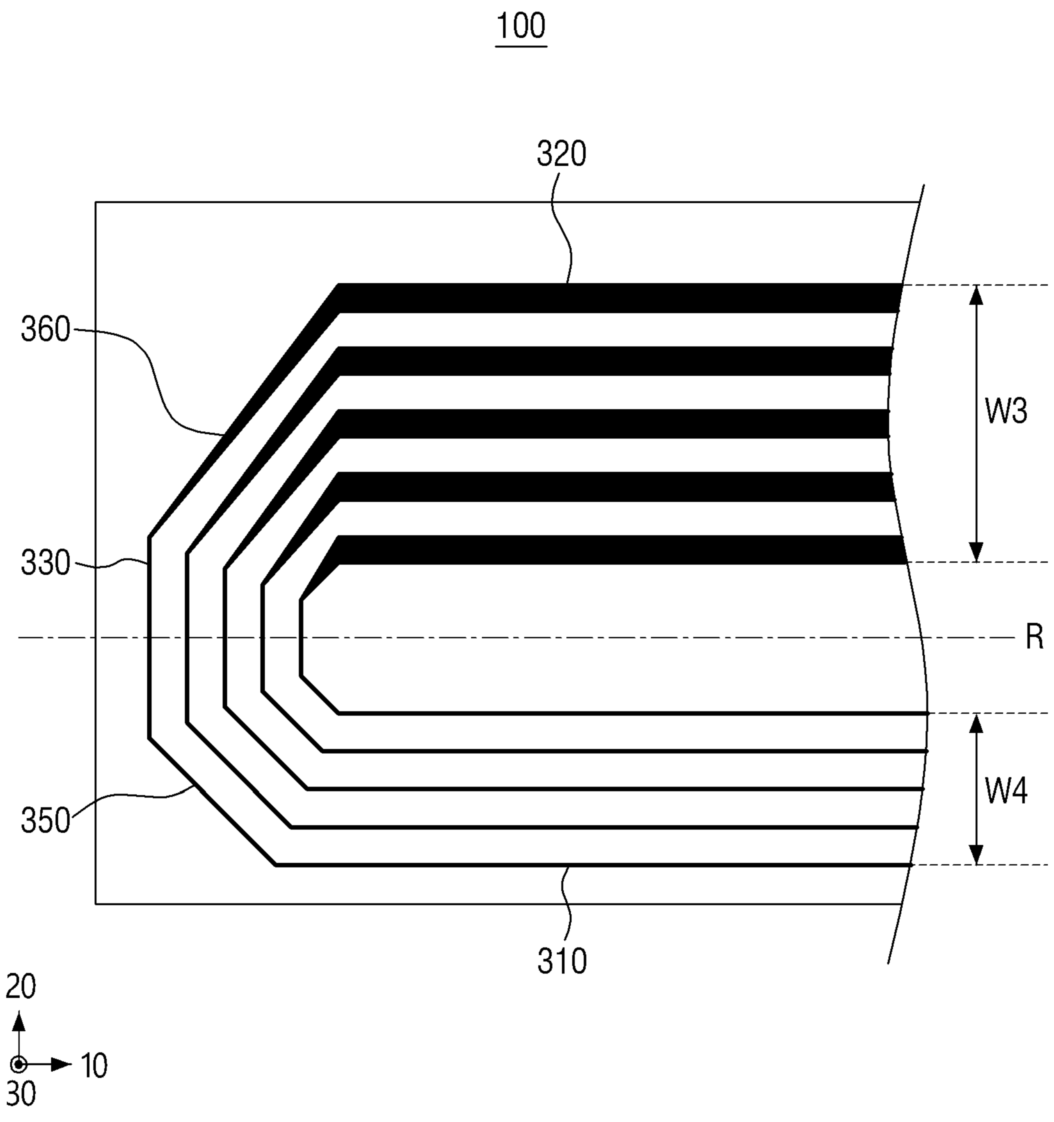
FIG. 12 is a second exemplary view for describing various shapes of coil patterns constituting a coil substrate according to an embodiment of the present disclosure.

When the pattern width of at least one of the second straight portion 320, the fourth straight portion 340, the second curved portion 360, and the third curved portion 370 is wider than the pattern width of the first straight portion 310, for example, as shown in FIG. 12, when the pattern width of the second straight portion 320 and the second curved portion 360 is formed by extending the pattern width of the first straight portion 310, the width W3 formed by the second straight portion 320 and the second curved portion 360 may be wider than the width W4 formed by the first straight portion 310 (W3>W4), and thus, the area of the coil pattern 120 on the second region 220 may be larger than the area of the coil pattern 120 on the first region 210. FIG. 12 is a second exemplary view for describing various shapes of coil patterns constituting a coil substrate according to an embodiment of the present disclosure.

In the above case, since only the area of the coil pattern 120 on the second region 220 is expanded in the short axis direction as in the case of (i), the flow of current increases as the resistance decreases, and the effect of strengthening the strength of the electromagnetic force can be obtained. In addition to this, since the vertical symmetry of the coil substrate 100 can be relatively maintained compared to the case of (i), balance with a magnetic material described later can be secured in the electronic apparatus.

Meanwhile, in the above case, the pattern width of the second straight portion 320, the fourth straight portion 340, the second curved portion 360, or the third curved portion 370 may be gradually extended from one end to the other end. In this case, voltage fluctuation can be prevented by suppressing a phenomenon, in which a current flow rapidly changes.

(iii) When the interval between patterns of at least one of the second straight portion 320, the fourth straight portion 340, the second curved portion 360, and the third curved portion 370 is wider than the interval between patterns of the first straight portion 310

Figure 13:
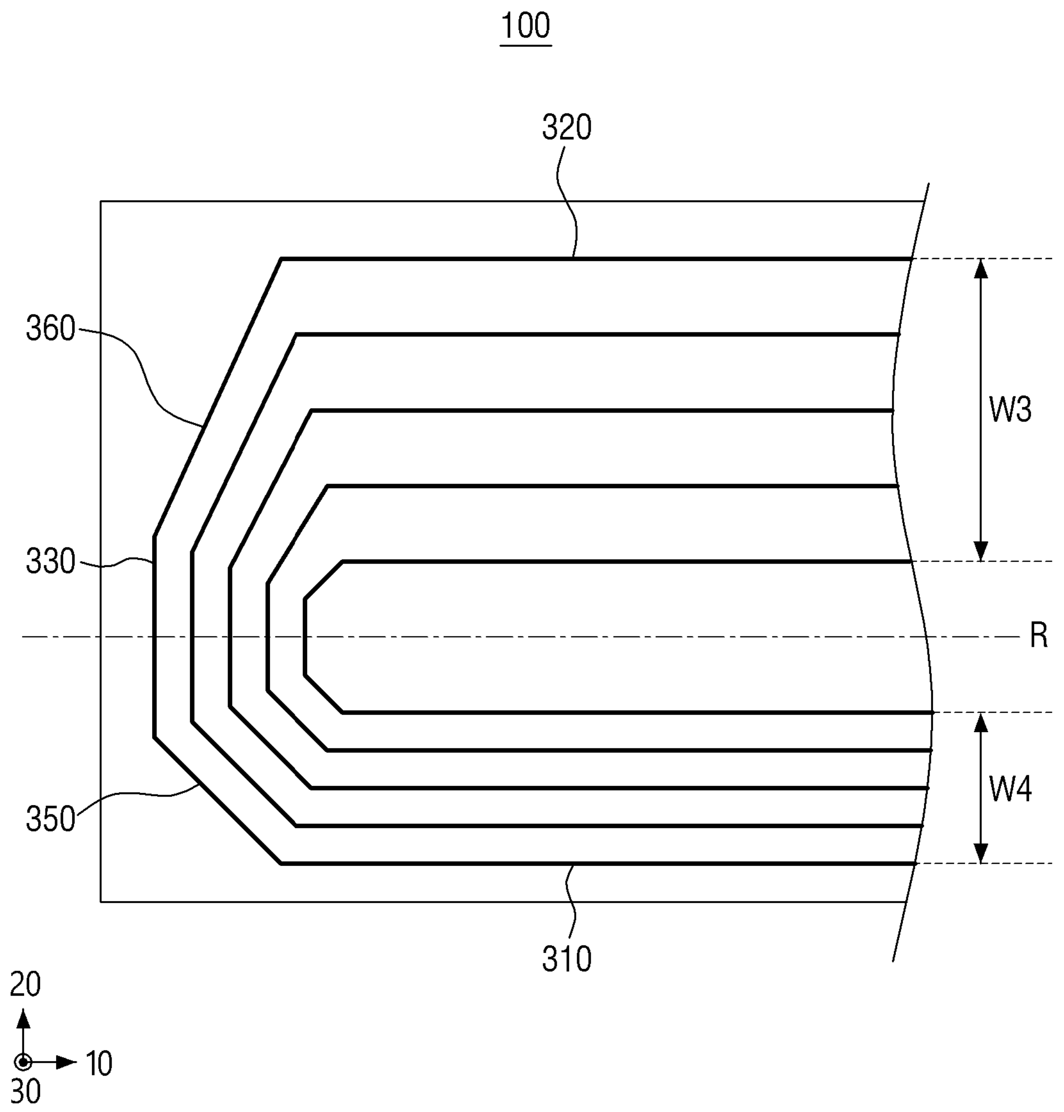
FIG. 13 is a third exemplary view for describing various shapes of coil patterns constituting a coil substrate according to an embodiment of the present disclosure.

When the interval between patterns of at least one of the second straight portion 320, the fourth straight portion 340, the second curved portion 360, and the third curved portion 370 is wider than the interval between patterns of the first straight portion 310, for example, as shown in FIG. 13, when the interval between patterns of the second straight portion 320 and the second curved portion 360 is wider than the interval between patterns of the first straight portion 310, the width W3 formed by the second straight portion 320 may be wider than the width W4 formed by the first straight portion 310 (W3>W4), and thus an area of the second region 220 may be larger than that of the first region 210. FIG. 13 is a third exemplary view for describing various shapes of coil patterns constituting a coil substrate according to an embodiment of the present disclosure.

In the above case, the resistance can be lowered by suppressing the effects of leakage current between patterns and signal interference in the second region 220, and furthermore, it is designed to be adjacent to other parts such as lenses disposed inside the electronic apparatus to be described later, thereby reducing an electrical error problem that occurs mutually with the coil substrate 100 according to the present disclosure.

(II) When the number of windings of the coil pattern 120 formed on the first region 210 is different from the number of windings of the coil pattern 120 formed on the second region 220

(i) When the number of windings of the second straight portion 320 is greater than the number of windings of the first straight portion 310

Figure 14:
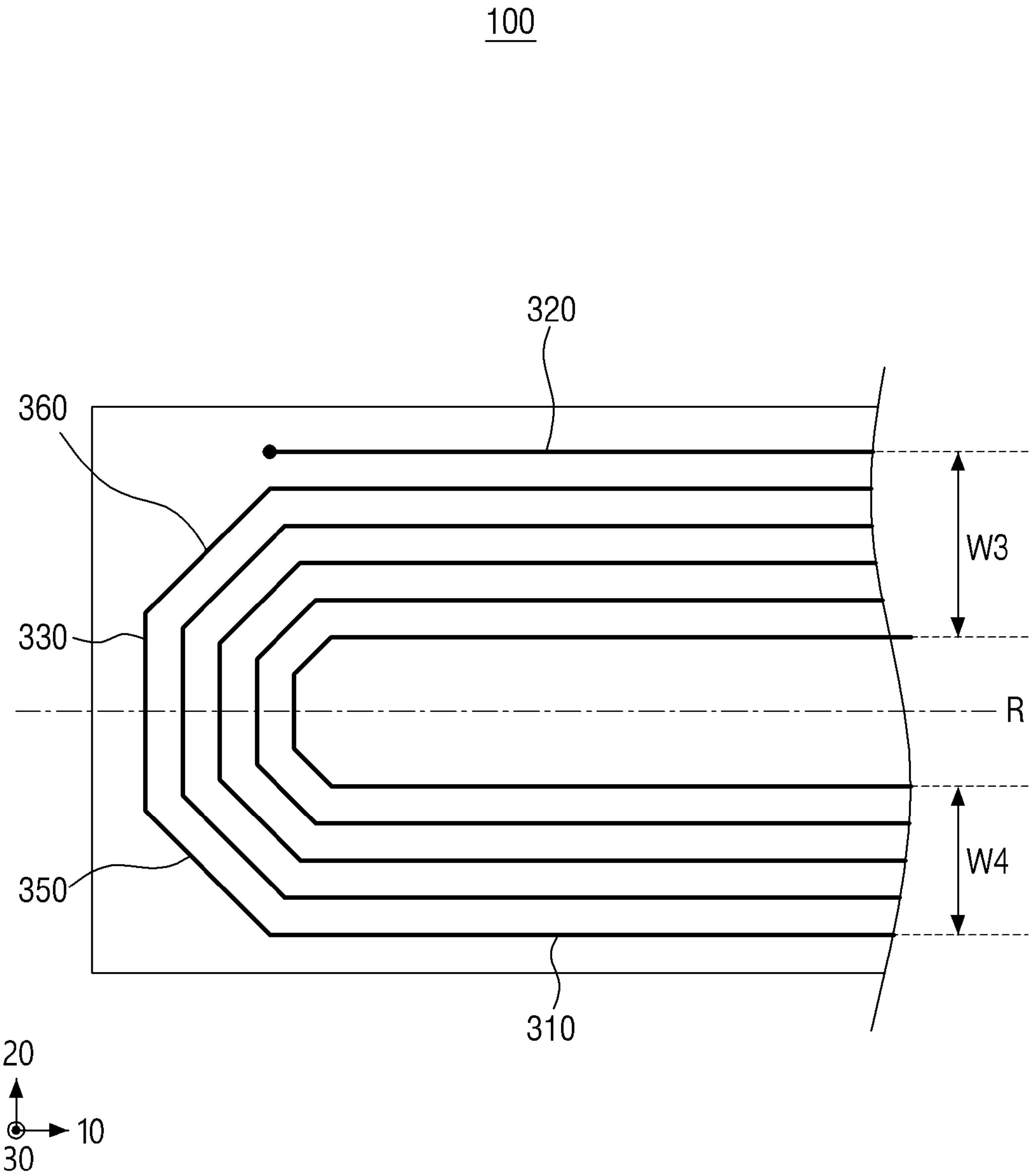
FIG. 14 is a fourth exemplary view for describing various shapes of coil patterns constituting a coil substrate according to an embodiment of the present disclosure.

When the number of windings of the second straight portion 320 is greater than the number of windings of the first straight portion 310, even if the interval between the patterns of each straight portion is the same, the width W3 may be wider than the width W4 as shown in FIG. 14 (W3>W4). In this case, the electromagnetic force may be enhanced by increasing the number of windings of the coil substrate 100. FIG. 14 is a fourth exemplary view for describing various shapes of coil patterns constituting a coil substrate according to an embodiment of the present disclosure.

Figure 15:
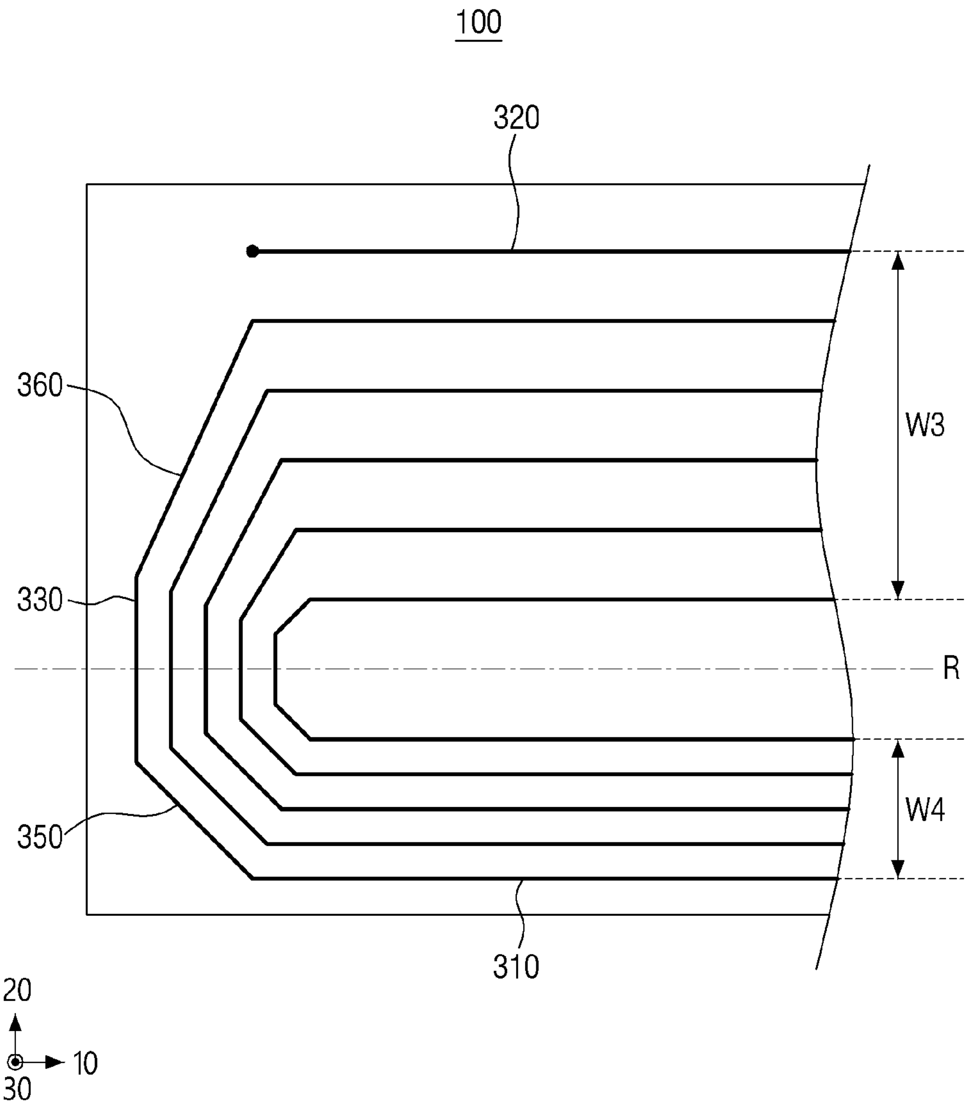
FIG. 15 is a fifth exemplary diagram for describing various shapes of coil patterns constituting a coil substrate according to an embodiment of the present disclosure.

Meanwhile, if the interval between the second straight portions 320 is wider than the interval between the first straight portions 310, the width W3 may be wider than the width W4 compared to the case of FIG. 14 (W3>W4). This can add the resistance effect described in (I)(iii) while securing the enhanced electromagnetic force. FIG. 15 is a fifth exemplary view for describing various shapes of coil patterns constituting a coil substrate according to an embodiment of the present disclosure.

Meanwhile, even if the interval between the second straight portions 320 is smaller than the interval between the first straight portions 310, if the pattern width of the second straight portion 320 is greater than the pattern width of the first straight portion 310, the resistance reduction effect can be obtained since it is a case where the area of the coil pattern 120 on the second region 220 is larger than the area of the coil pattern 120 on the first region 210. However, in this case, it should be noted that the level at which the interval between the second straight portions 320 is narrowed should be designed in consideration of influence factors such as leakage current or heat generation.

Meanwhile, when the number of windings of the first straight portion 310 is greater than the number of windings of the second straight portion 320, the case when the number of windings of the second straight portion 320 is greater in the above, that is, (i) of (II) can be equally applied.

On the other hand, the effects of (I) and (II) above can be applied at the same or similar level to the third straight portion 330, the fourth straight portion 340, the first curved portion 350 to the fourth curved portion 380, etc.

The coil substrate 100 described above may include one coil pattern 120 on one base layer 110 with reference to FIG. 2. However, the present embodiment is not limited thereto. The coil substrate 100 may also include a plurality of coil patterns 120 on one base layer 110.

When the coil substrate 100 includes a plurality of coil patterns 120, the plurality of coil patterns 120 may be formed on one surface of the base layer 110, and at least one coil pattern 120 may be formed on both surfaces of the base layer 110, respectively. In this embodiment, in this case, at least one coil pattern 120 among the plurality of coil patterns 120 may be formed in various embodiments described with reference to FIGS. 2 to 15.

When the plurality of coil patterns 120 are formed on one surface of the base layer 110, the plurality of coil patterns 120 may be stacked in the thickness direction of the pattern or arranged in a row in the width direction.

Figure 16:
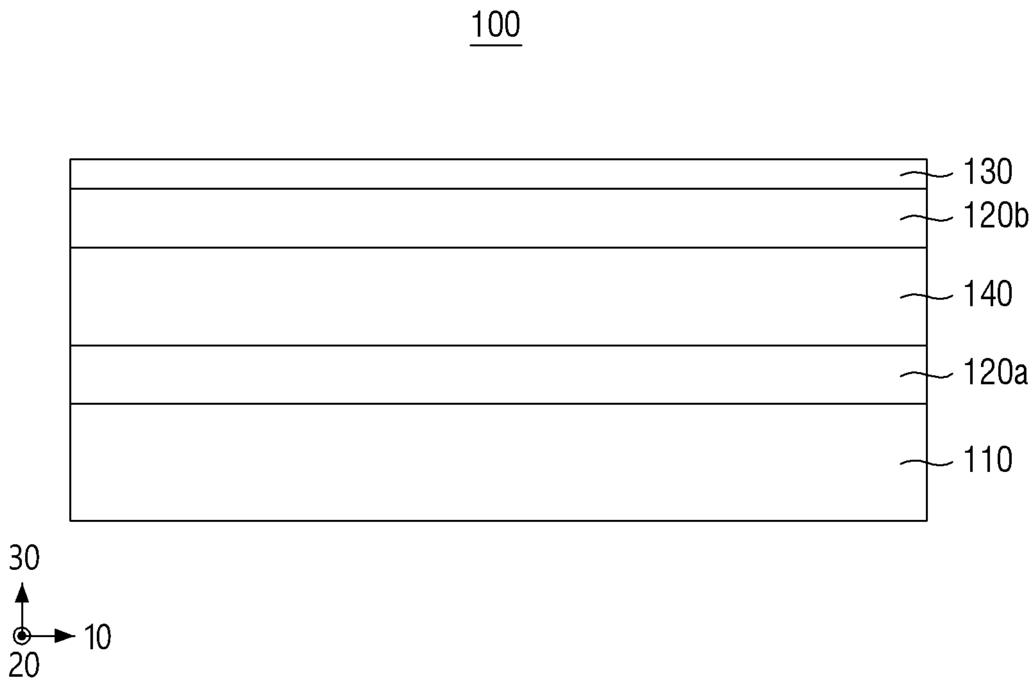
FIG. 16 is a cross-sectional view of a coil substrate according to another embodiment of the present disclosure.

In addition, when a plurality of coil patterns 120 are formed by being stacked on one surface of the base layer 110, an interlayer insulating layer may be formed between two adjacent coil patterns 120. For example, as shown in FIG. 16, the base layer 110, the first coil pattern 120*a*, the interlayer insulating layer 140, the second coil pattern 120*b*, and the protective layer 130 may be stacked in this order. FIG. 16 is a cross-sectional view of a coil substrate according to another embodiment of the present disclosure.

Meanwhile, although not shown in FIG. 16, each coil pattern may be connected in a manner such as a via or a conductive pad.

When at least one coil pattern 120 is formed on both surfaces of the base layer 110, each coil pattern may be disposed facing each other in the longitudinal direction or width direction or sequentially disposed along the outer circumferential surface of the base layer 110. For example, when two coil patterns 120 are respectively disposed on the parallel outer circumferential surface of the base layer 110, both coil patterns may receive separate signals or, although not shown, may be connected by a wiring pattern to receive the same signal. In particular, when both coil patterns are arranged in mirror symmetry with respect to one axis while being connected by a wiring pattern, the electromagnetic force acts in the same direction inside the electronic apparatus described later, so that the total electromagnetic force by the coil substrate can be enhanced.

The plurality of coil patterns described above may have the same shape or partially different structures.

Figure 17:
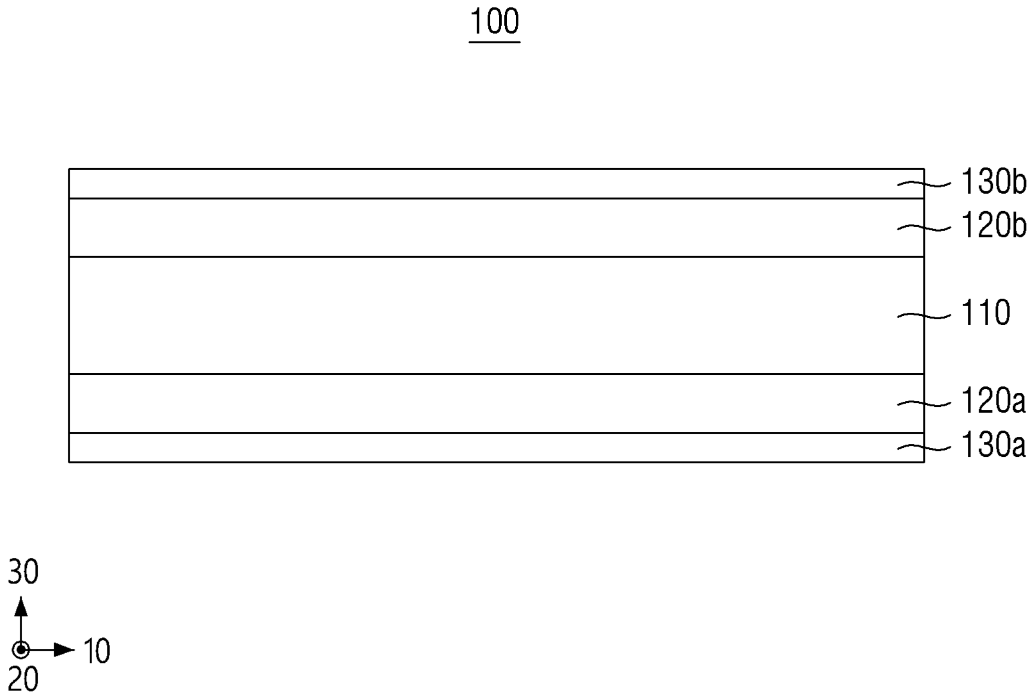
FIG. 17 is a cross-sectional view of a coil substrate according to another embodiment of the present disclosure.

Meanwhile, when at least one coil pattern 120 is formed on both surfaces of the base layer 110, the same number of coil patterns 120 may be formed on both surfaces of the base layer 110, and different numbers of coil patterns 120 may be formed on both surfaces of the base layer 110. When the plurality of coil patterns 120 are formed on at least one of both surfaces of the base layer 110, the plurality of coil patterns 120 may be formed by being stacked in the thickness direction or arranged in a width direction, and an interlayer insulating layer may be formed between the adjacent two coil patterns 120. For example, when one coil pattern 120 is formed on both sides of the base layer 110, respectively, as shown in FIG. 17, the first protective layer 130*a*, the first coil pattern 120*a*, the base layer 110, the second coil pattern 120*b*, and the second protective layer 130*b* may be stacked in this order on the coil substrate 100. FIG. 17 is a cross-sectional view of a coil substrate according to another embodiment of the present disclosure.

In addition, in the coil substrate 100 according to the present disclosure, not only the coil pattern 120 on one surface or both surfaces of the base layer 110, but also other external elements such as sensors, filters, inductors, ICs, or a wiring pattern (not shown) connected to the external elements and transmitting a signal may be further formed and the coil substrate 100 may be connected.

Various embodiments of the coil substrate 100 have been described above with reference to FIGS. 1 to 17. A case, in which the above-described coil substrate 100 is applied to a camera actuator among various electronic apparatus, will be described later as an example, and the coil substrate 100 may be provided inside the housing of the actuator together with a magnetic material (e.g., a magnet). In this case, both sides of the magnetic material may be formed symmetrically with respect to the same axis as the coil substrate 100 symmetrically formed with respect to the central axis of the coil pattern.

Since the lens driving performance of the actuator may be affected by the interval between the coil substrate 100 and the magnetic material, whether the central axes are the same, etc., the present disclosure provides an electronic apparatus designed by considering the coil substrate according to an embodiment and the relationship between the coil substrate and the magnetic material.

FIG. 18 is an experimental example comparing lens driving performance and resistance according to a correlation between a magnet and a coil substrate (cases (ii) of (I)) according to an embodiment of the present disclosure and the prior art. Through this, it is possible to derive an optimal design of a coil substrate for a camera actuator and a magnetic material (magnet).

In the control group of this experiment, the first region 210 and the second region 220 of the coil pattern are symmetrically formed with the same size with respect to the reference axis line R, and the reference axis line R coincides with the central axis of the magnetic material.

In experimental group 1, the first region 210 and the second region 220 of the coil pattern are formed in different sizes with respect to the reference axis line R, and for example, the first region 210 is formed at the same or equivalent level as the first region 210 of the control group but the second region 220 is formed to have a larger size. Accordingly, the reference axis line R may coincide with the central axis of the magnetic material.

In experiment group 2, the first region 210 and the second region 220 of the coil pattern are symmetrically formed to have the same size with respect to the reference axis line R, but are formed to be expanded compared to the size of the first and second regions of the control group. Accordingly, since the position of the void region is spaced apart, the position of the reference axis line R may also be different from that of the control group and may not coincide with the central axis of the magnetic material.

In experimental group 3, the first region 210 and the second region 220 of the coil pattern and the reference axis line R are the same as in experimental group 1, but the reference axis line R does not coincide with the central axis of the magnetic material.

(1) Electromagnetic force strength: control group>experimental group 1>experimental group 3>experimental group 2

(2) Change in electromagnetic force according to magnet position (Min/Max, movement amount): control group<experimental group 1<experimental group 2<experimental group 3

(3) Resistance: control group>experimental group 1>experimental group 2

As the camera actuator corrects the lens position by changing the magnetic field according to the movement of the magnet, the stronger the strength of the electromagnetic force during the movement of the magnet does not change rapidly, the better, and the performance can be maximized by maintaining an appropriate level of low resistance. Therefore, the design of the coil substrate and magnet suitable for the camera actuator can be in the order of experimental group 1, experimental group 3, experimental group 2, and control group, and in experimental group 1 and experimental group 2, the strength of the electromagnetic force varies depending on whether the center coincides with the magnet, and the change (movement amount) of the electromagnetic force varies depending on whether the first region and the second region are symmetrical.

However, since the difference in the strength of the electromagnetic force compared to the difference in movement amount between experiment group 1 and experiment group 2 was larger, it can be seen that experiment group 1, that is, the design of the coil substrate according to an embodiment of the present disclosure is effective for the camera actuator.

On the other hand, in the case of experimental group 1 and experimental group 3, the symmetry of the first region and the second region was the same, but the results of the electromagnetic force, the change of the electromagnetic force, and the resistance were different depending on whether the center coincided with the magnet. The electromagnetic force was stronger in experimental group 1, but in terms of resistance, experimental group 3 showed smaller results. The change in electromagnetic force was confirmed to be relatively effective in experiment group 1 compared to experiment group 3, but it was a slight difference.

In addition to the above experimental example, it was examined the electromagnetic force, change in electromagnetic force, and resistance according to the degree of mismatch between the central axis of the magnet of experiment group 3, and confirmed that all the results were excellent in the case where the central axis of the magnet is disposed within the void region V of experiment group 3. That is, in light of the tendency of experimental group 1 and experimental group 3, to which the coil substrate according to the present disclosure is applied, performance suitable for the camera actuator can be secured by the asymmetric structure, and in particular, it was confirmed that an effective effect can be obtained only when the central axis of the magnet and the reference axis line R coincide or the central axis of the magnet is located within the void region V of the coil substrate.

In addition, in the case of a coil substrate applied to a camera actuator, a spare space is formed on the base substrate in the lens direction in most cases considering the A/M, coupling area with other parts, and wiring area. Therefore, it can be said that there is another effect of the present disclosure in improving the performance of the actuator by extending to one side while maintaining the central axis with the magnet to balance the strength and change of the electromagnetic force.

The present disclosure can be applied to a coil substrate and an electronic apparatus (e.g., a camera actuator) including the coil substrate.

Although the embodiments of the present disclosure have been described with reference to the above and the accompanying drawings, those skilled in the art, to which the present disclosure pertains, will understand that the present disclosure can be practiced in other specific forms without changing the technical idea or features. Therefore, the embodiments described above should be understood as illustrative in all respects and not limiting.

What is claimed is:

1. A coil substrate comprising:

a base layer; and a coil pattern spirally wound on the base layer, wherein an upper portion of the base layer is divided into a first region and a second region based on a void region formed inside the coil pattern, wherein an area of the coil pattern formed in the second region is larger than an area of the coil pattern formed in the first region, and wherein the coil pattern comprises, a plurality of first straight portions formed in the first region;

a plurality of second straight portions formed in the second region;

a plurality of third straight portions formed in the first region and the second region, and formed on two sides of the first straight portion and the second straight portion;

a plurality of first curved portions formed in the first region and connecting the first straight portion and the third straight portion; and a plurality of second curved portions formed in the second region and connecting the second straight portion and the third straight portion.

2. The coil substrate of claim 1, wherein the first region and the second region are divided based on a reference axis line formed from one end of the base layer to the other end of the base layer along a longitudinal direction of the void region, wherein the reference axis line is formed across a center of a short axis of the void region.

3. The coil substrate of claim 1, wherein the coil pattern is formed on one surface of the base layer in plural, or at least one coil pattern is formed on two surfaces of the base layer, respectively, wherein an interlayer insulating layer is formed between two adjacent coil patterns when the coil pattern is formed on one surface of the base layer in plural.

4. The coil substrate of claim 1, wherein the first straight portion is formed along a longitudinal direction of the first region, wherein the second straight portion is formed parallel to the first straight portion, wherein the third straight portion is formed in a direction perpendicular or oblique to the first straight portion and the second straight portion, wherein the first curved portion and the second curved portion are formed in an oblique shape or an arc shape.

5. The coil substrate of claim 1, wherein a width of the plurality of second straight portions is wider than a width of the plurality of first straight portions.

6. The coil substrate of claim 5, wherein a width of the plurality of third straight portions is the same as a width of the plurality of first straight portions, wherein a width of the plurality of second curved portions extends from the third straight portion in a direction of the second straight portion.

7. The coil substrate of claim 5, wherein a width of the plurality of first curved portions is the same as a width of the plurality of first straight portions, wherein a width of the plurality of second curved portions is the same as a width of the plurality of second straight portions, wherein a width of the plurality of third straight portions extends from the first curved portion in a direction of the second curved portion.

8. The coil substrate of claim 5, wherein the number of windings of the second straight portion is the same as or greater than the number of windings of the first straight portion.

9. The coil substrate of claim 1, wherein a width of the plurality of second straight portions is the same as a width of the plurality of first straight portions, wherein the number of windings of the second straight portions is greater than the number of the windings of the first straight portions.

10. The coil substrate of claim 1 further comprises, a protective layer formed on the coil pattern and for protecting the coil pattern.

11. An electronic apparatus comprising:

a housing;

a coil substrate installed inside the housing; and a magnetic material spaced apart from the coil substrate and installed inside the housing, wherein the coil substrate comprises, a base layer; and a coil pattern spirally wound on the base layer, wherein an upper portion of the base layer is divided into a first region and a second region based on a void region formed inside the coil pattern, wherein an area of the coil pattern formed in the second region is larger than an area of the coil pattern formed in the first region, and wherein the coil pattern comprises, a plurality of first straight portions formed in the first region;

a plurality of second straight portions formed in the second region;

a plurality of third straight portions formed in the first region and the second region, and formed on two sides of the first straight portion and the second straight portion;

a plurality of first curved portions formed in the first region and connecting the first straight portion and the third straight portion; and a plurality of second curved portions formed in the second region and connecting the second straight portion and the third straight portion.

12. The electronic apparatus of claim 11, wherein the housing is a housing of a camera actuator.

13. The electronic apparatus of claim 11, wherein both sides of the magnetic material are symmetrical with the same reference as the void region of the coil substrate.

* * * * *